Sept. 21, 1965     D. A. HARPER     3,207,529

LIMITING MECHANISM

Filed Dec. 10, 1962     4 Sheets-Sheet 1

INVENTOR.
David A. Harper
BY
Attys.

Sept. 21, 1965 D. A. HARPER 3,207,529
LIMITING MECHANISM
Filed Dec. 10, 1962 4 Sheets-Sheet 2

INVENTOR.
David A. Harper

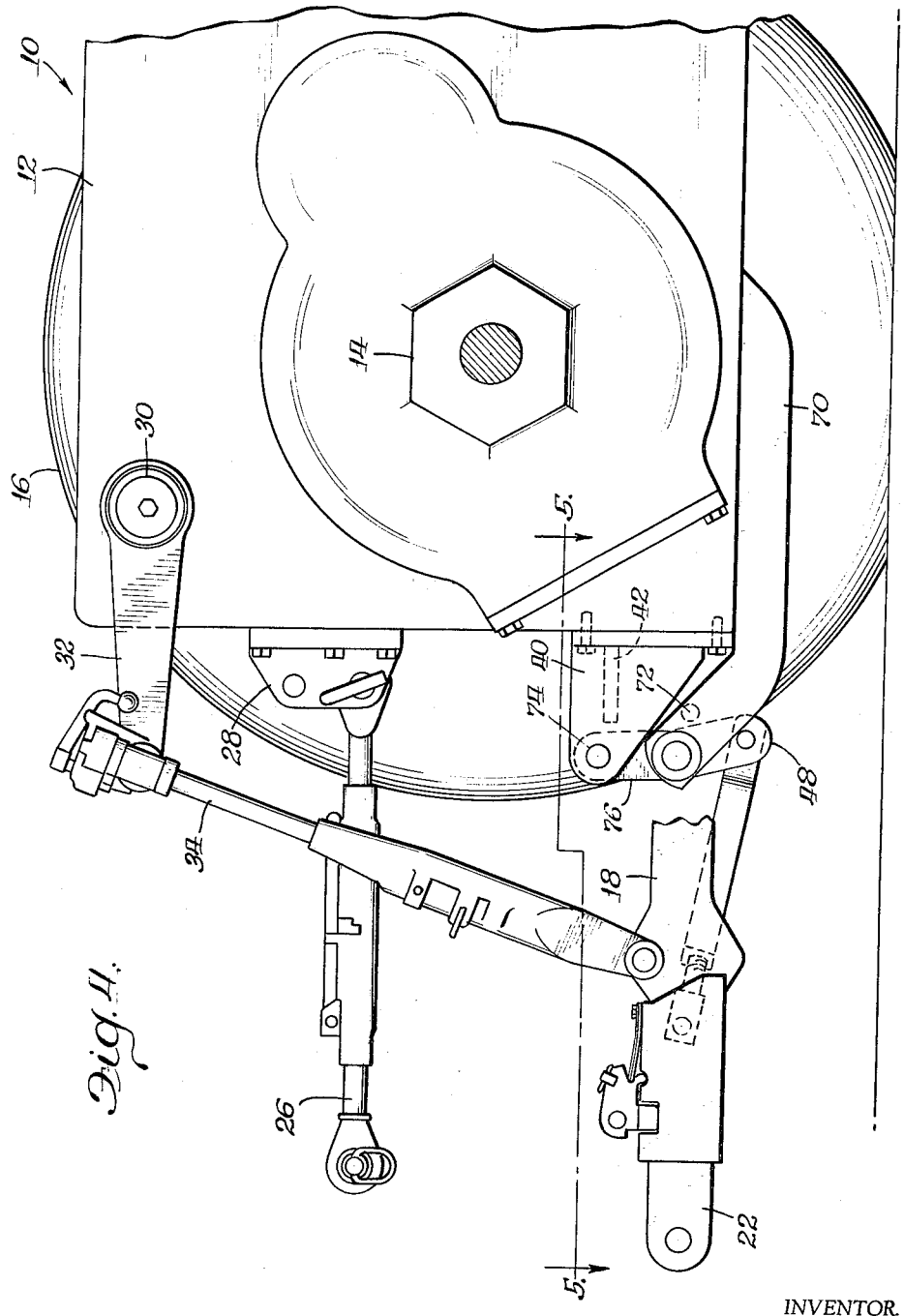

Sept. 21, 1965    D. A. HARPER    3,207,529
LIMITING MECHANISM
Filed Dec. 10, 1962    4 Sheets-Sheet 4
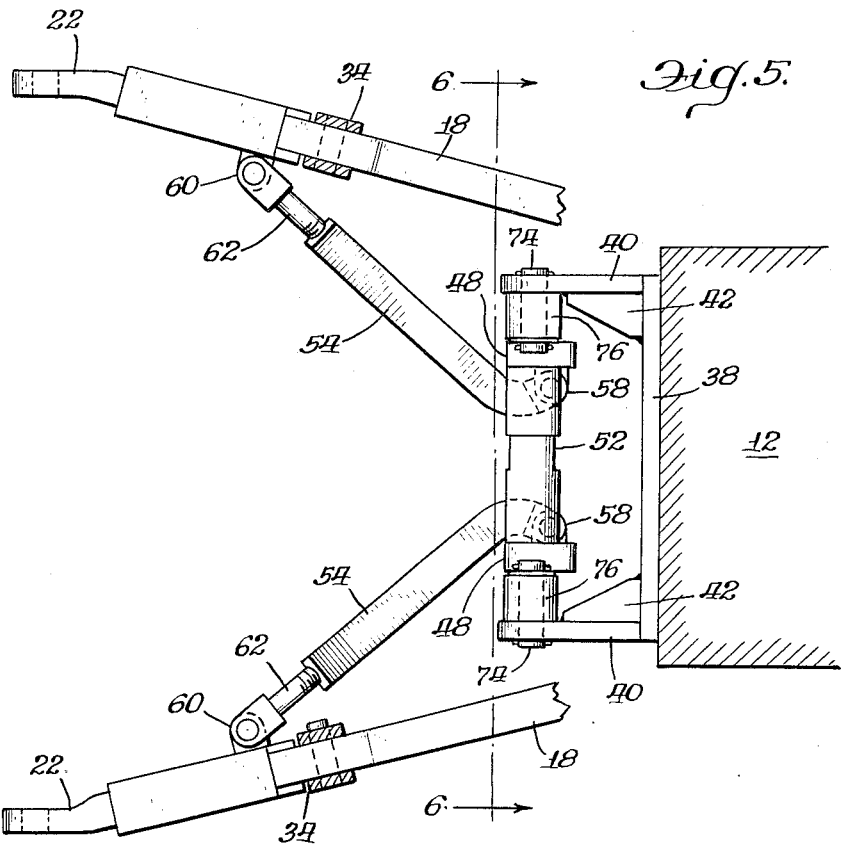
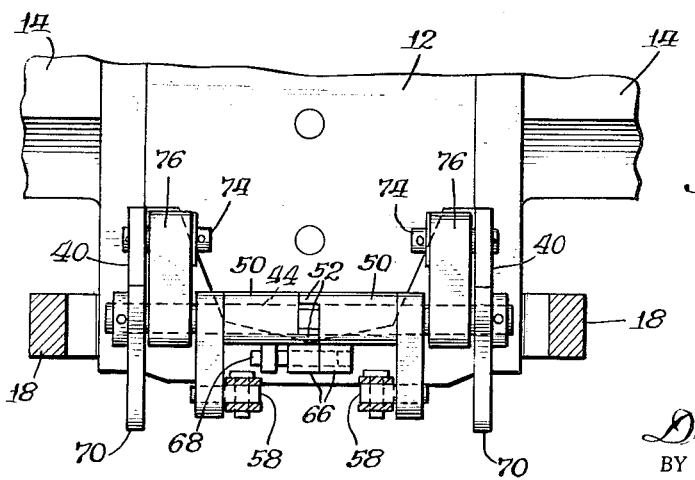
INVENTOR.
David A. Harper

United States Patent Office 3,207,529
Patented Sept. 21, 1965

1

3,207,529
LIMITING MECHANISM
David A. Harper, Bridgeview, Ill., assignor to International Harvester Company, Chicago, Ill., a corporation of New Jersey
Filed Dec. 10, 1962, Ser. No. 243,417
11 Claims. (Cl. 280—460)

This invention relates generally to implement attaching mechanisms. More particularly it is concerned with a mechanism for limiting lateral sway in a hitch device of the type used for coupling an associated implement to a vehicle, such as a tractor.

With certain types of tractor-mounted ground-working implements, it is desirable that the implement be allowed to sway laterally independently of the movement of the tractor. This is particularly desirable in order to allow the tractor to be turned at the end of a row or to follow a prescribed path, such as in contour plowing while the attached implement continues to work the soil. Lateral sway, however, must be controlled and limited so as not to cause interference with operation of the vehicle. Of course, it is desirable that such lateral sway be reduced or eliminated in certain positions of the implement to provide a stable and safe arrangement. Heretofore, such sway limiting objectives were usually attained by means of so-called stabilizing or limiting chains which were never completely satisfactory because of the tendency of the chains to take a permanent set under extreme loads. Also, the chains, when located between the lower draft links adjacent a center rear portion of the vehicle, tended to create an interference condition with certain implements and swinging drawbar attachments. When the chains were located on the outside of two lower draft links and anchored outboard on a rear portion of the vehicle, they tended to create a V-type wedge which frequently operated to catch and cause resultant damage to certain row crops.

With certain other types of implements, it is desirable that the implement be restricted from any lateral sway throughout its working range as well as in its transport position. However, since this type of implement is not usually a ground-penetrating tool, vehicle maneuverability is not affected by the implement being restricted from side sway. In the past, sway restriction for such implements was frequently accomplished by means of an additional special attachment commonly termed a "hitch stabilizer attachment" which usually consisted of two inboard or outboard mounted pivot pin brackets and two links which were interconnected between the pivot pin bracket and the implement-attaching pins, and which served no useful purpose when other types of implements requiring lateral movement were employed.

It is an object of the present invention to provide an improved and simplified mechanism particularly adapted for use with tractors having swingable draft links and power lift apparatus connected with the draft links for raising and lowering an implement attached thereto, for controlling the side sway or lateral swinging movements of said draft links in all operating and transport positions of any implement when attached by said draft links.

Another object of the present invention is to provide lateral limiting controlling means arranged for selectivity permitting or restricting limited lateral sway of an attached implement in any raised or lowered position thereof.

Another object of the present invention is to provide lateral limiting controlling means arranged for selectively lected adjustment thereof an implement attached to an associated hitch device will be permitted limited lateral sway, and in another selected adjustment thereof the implement will be permitted no lateral sway either in the operating or transport positions thereof.

Another object of the present invention is to provide lateral limiting mechanism including relatively movable members coupled to the draft links for movement therewith, the relatively movable members being engageable upon the obtainment of a predetermined amount of lateral sway by the associated draft links for preventing further lateral movement of the associated draft links, and which mechanism provides means for locking the relatively movable members against relative movement for preventing entirely lateral sway of the associated draft links.

The foregoing and other objects and objectives of this invention will be apparent to those skilled in the art upon consideration of the following detailed description taken in conjunction with the accompanying drawings, in which:

FIGURE 4 is a fragmentary side elevational view showing a modified form of the hitch structure incorporating the lateral limiting mechanism;

FIGURE 5 is a plan view of the lateral limiting mechanism taken along the line 5—5 of FIGURE 4; and FIGURE 6 is a rear view of the lateral limiting mechanism taken along the line 6—6 of FIGURE 5.

Since the proposed device is adaptable for use with a variety of conventional types of vehicles, the particular tractor 10 with which it is illustrated as being associated is depicted only fragmentarily. As shown, this includes a main frame or chassis structure 12, which it should be understood, conventionally supports all the well-known power and drive components of such a vehicle, and additionally supports laterally outwardly extending rear axle housings 14, which in turn support ground-engaging means such as the wheels 16.

Figure 1:
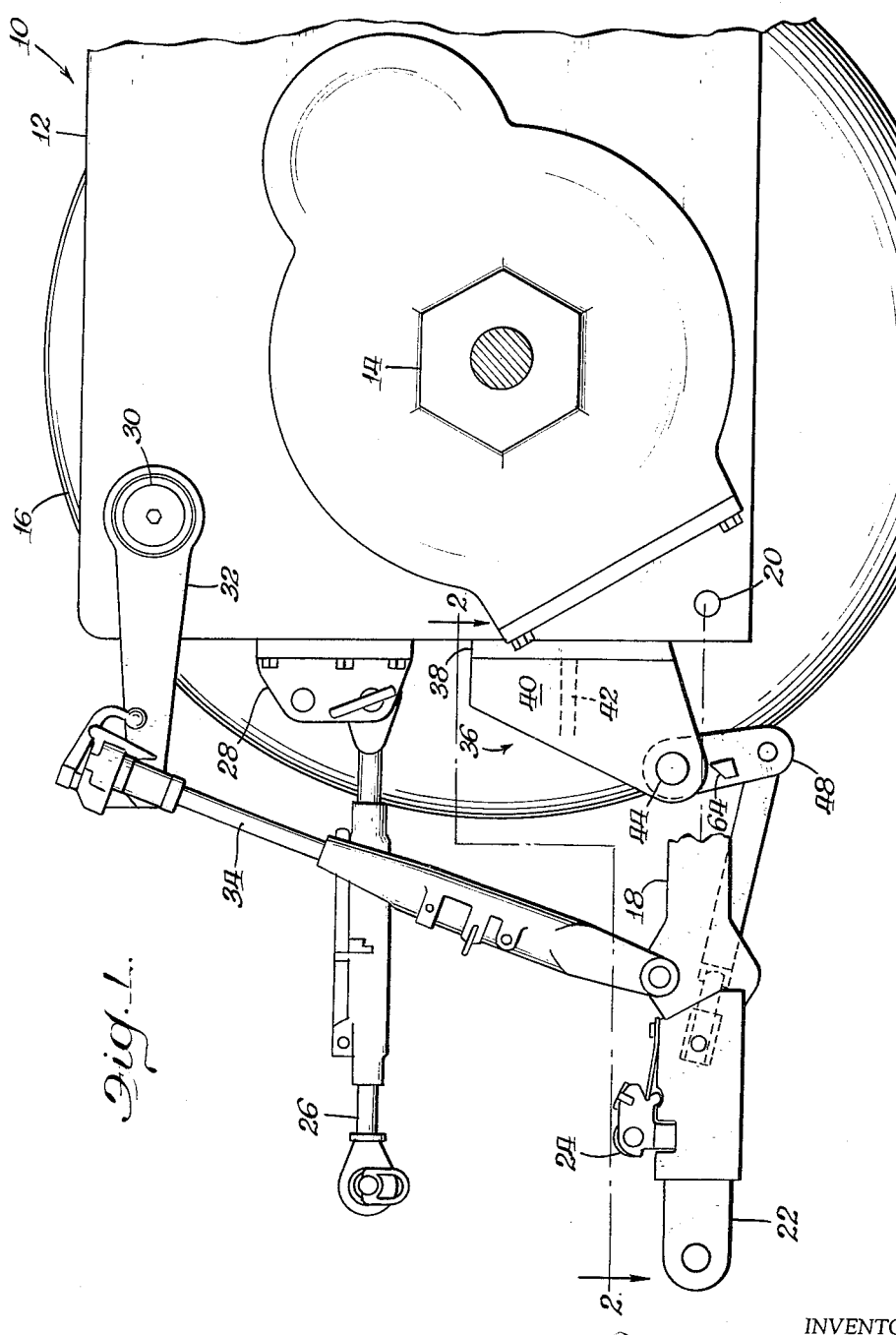
FIGURE 1 is a fragmentary side elevational view showing hitch structure incorporating the lateral limiting mechanism.
Figure 2:
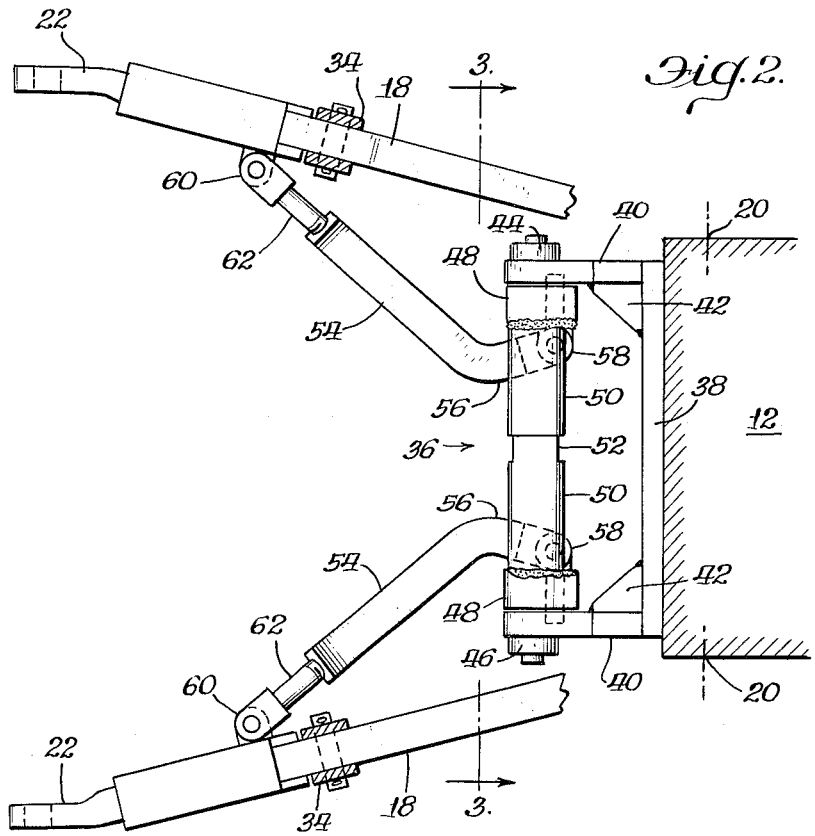
FIGURE 2 is a plan view of the lateral limiting mechanism taken along the line 2—2 of FIGURE 1.
Figure 3:
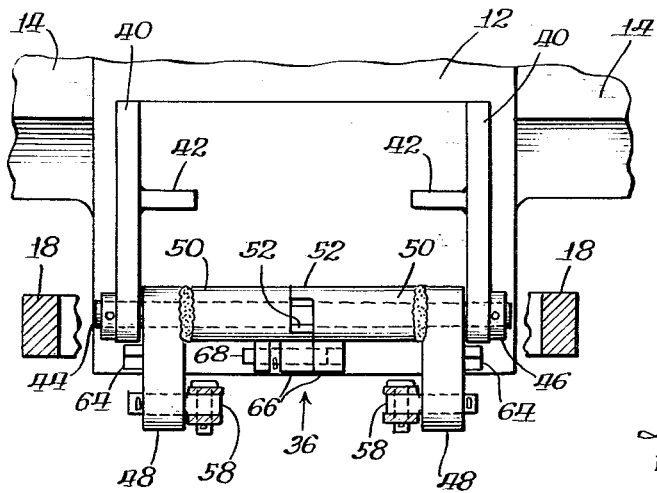
FIGURE 3 is a rear view of the lateral limiting mechanism taken along the line 3—3 of FIGURE 2.

Turning now more specifically to FIGURES 1, 2 and 3, a pair of draft links 18 is suitably mounted on opposite sides of the chassis structure 12 at convenient points 20, about which each is freely pivotal laterally and vertically relative to the tractor 10. Each draft link 18 is provided with an arm 22 which may be held in an extended or retracted position by means of a latching mechanism 24 so as to accommodate various types of implements associated with the tractor. An upper link 26 is supported by a suitable mounting structure 28 which, in turn, is carried by the chassis structure 12. One conventional arrangement would additionally provide suitable means (not shown) associated with the tractor 10 for sensing movement of upper link 26 in response to variations in draft of the associated implement.

A rockshaft 30 may be operated by suitable power lift means (not shown) for raising and lowering the hitch mechanism as is well understood and conventional in the art. A pair of arms 32 extends rigidly from rockshaft 30 and serves to support a pair of lift links 34 connected with draft links 18 for raising and lowering the hitch mechanism. As thus arranged, it will be appreciated that draft links 18 are readily swingable in a vertical plane about the axis defined by pivot points 20 upon operation of the power lift mechanism and, additionally, are swingable laterally from side to side relative to the longitudinal axis of the tractor 10.

In accordance with the more specific teachings of the invention, there is provided a lateral limiting mechanism generally designated at 36. The lateral limiting mechanism 36 includes a front wall member 38 and a pair of end wall members 40 attached rigidly thereto and supported by a pair of brace members 42. The lateral limiting mechanism 36 is suitably secured to chassis structure 12 of tractor 10 intermediate draft links 18.

End wall members 40 serve as a mounting for a shaft 44 extending therebetween, which shaft 44 is suitably secured thereto by means of attaching elements 46. Two extension members 48 are mounted for free rotational movement about shaft 44, each extension member 48 being positioned adjacent an associated end wall member 40 of limiting mechanism 36. Cylindrical members 50 are also mounted for free rotational movement about shaft 44 and are rigidly secured to respective extension members 48 for movement therewith. The cylindrical members 50 are provided with axial extensions in the form of segmental portions 52 which overlap one another along the axis of shaft 44 but which are spaced from one another both forwardly and rearwardly of shaft 44 in a plane normal to the axis of shaft 44. It will be readily understood that members 48 and 50 and segmental portions 52 are complemental, being reversely arranged so as to make one suitable for functioning on the right and the other on the left side of the vehicle.

The complemental connection arms 54 include end portions 56 curved to clear extension members 48 and to translate motion as brought out below. Arms 54 are mounted respectively to extension members 48 by means of suitable pivotal attaching means 58, and are connected with respective draft links 18 by means of suitable pivotal attaching means 60. Adjustment rods 62 are provided for varying the length of arms 54 so as to make adjustment thereof readily possible.

Each extension member 48 is provided with a bumper element 64. The bumper elements 64 and the end members 40 are fashioned with complementary surfaces which engage as draft links 18 reach their upper limits of vertical movement in order to assure that in this transport position the draft links are at an equal height.

Two cylindrical elements 66 are welded or otherwise suitably secured, respectively, to cylindrical members 50 and extend therefrom. Cylindrical elements 66 are so oriented relative to cylindrical members 50 that they are in axial alignment when the forward and rearward spacings between segmental portions 52 of cylindrical members 50 are equal. In this position the lateral limiting mechanism 36 may be locked by the insertion of a suitable locking pin 68 into cylindrical elements 66, thus preventing relative rotation between cylindrical members 50.

When lateral sway is to be prevented, locking pin 68 is inserted in position within cylindrical elements 66. Relative rotation between cylindrical member 50 is prevented and, accordingly, arms 54 prevent lateral sway of draft links 18.

When limited lateral sway is desired, locking pin 68 is removed. Assuming lateral sway of draft links 18 in the downward direction as shown in FIGURE 2, each arm 54 will be carried downward with its associated draft link 18. This movement of arms 54 acts through curved end portions 56 to rotate extension members 48 as well as cylindrical members 50 in opposite directions relatively about shaft 44. Continued movement of draft links 18 rotates cylindrical members 50 until segmental portions 52 abut. This abutment prevents additional rotation of cylindrical members 50, thereby preventing continued lateral sway of draft links 18 in the direction of original movement.

Obviously, lateral sway of draft links 18 in the opposite direction will cause relative rotation of cylindrical members 50 in the opposite direction until segmental portions 52 are again brought into abutting relationship, at which time continued sway of draft links 18 again will be prevented.

The point at which further lateral sway of draft links 18 is prevented may be predetermined by the shape and size of arms 54. As noted, the size of arms 54 may be adjusted by means of rods 62. Of course, the size of segmental portions 52, which determines the spacing between their abutting surfaces, also determines the point at which further movement of draft links 18 laterally relative to in the modified construction depicted.

Turning now more specifically to FIGURES 4, 5 and 6, it will be seen that like numerals represent like elements in the modified cnstruction depicted.

A pair of beam members 70 is conventionally supported by chassis structure 12 of tractor 10 for movement slidably parallel to the longitudinal axis of tractor 10. Beam members 70 extend rearwardly beyond chassis section 12. The draft links 18 are pivotally connected to respective beam members 70 at convenient pivot points 72 rather than to the chassis structure 12. Draft links 18 are readily swingable laterally about the longitudinal axis of tractor 10 and, additionally, are swingable in a vertical plane about pivot points 72 upon operation of the power lift mechanism. Suitable sensing mechanism (not shown) may be provided to sense the longitudinal displacement of beam members 70, which longitudinal displacement is a function of the movement of draft links 18 in response to variations in draft of the associated implement.

Each end wall member 40 mounts a shaft 74, from which depends a hanger member 76. Each hanger member 76 is freely pivotal about its respective associated shaft 74 for free swinging movement. Shaft 44 is mounted between hanger members 76 while beam members 70 are supported by shaft 44 outwardly of hanger members 76. Extension members 48 and cylindrical members 50 are mounted about shaft 44 intermediate hanger members 76. The securing elements 46 complete this mounting arrangement.

The operation of the modified structure shown in FIGURES 4, 5 and 6 is essentially similar to that shown in FIGURES 1, 2 and 3. However, it should be noted that swingable hanger members 76 allow movement of draft links 18 and beam members 70 longitudinally relative to tractor 10 without affecting the operation of the lateral limiting mechanism, as shaft 44 and the members carried thereby are carried with draft links 18 and beam member 70.

Since various modifications can be made in the invention as hereinabove described, and many apparently widely different embodiments of same made within the spirit and scope of the claims without departing from such spirit and scope, it is intended that all matter contained in this description shall be interpreted as illustrative only and not in a limiting sense.

I claim:
1. In an implement hitch for a tractor having a pair of draft links swingable laterally relative to the tractor, lateral swing limiting means adapted to be disposed adjacent the draft links, said limiting means comprising a pair of elements each connectable with one of the draft links, said elements being relatively rotatable in response to lateral movement of the draft links and being interengageable upon a predetermined movement of the draft links to prevent further movement thereof.

2. In an implement hitch for a tractor having a pair of draft links swingable laterally relative to the tractor, lateral swing limiting means adapted to be disposed adjacent the draft links, said limiting means comprising a frame having wall portions, a shaft mounted in said wall portions, a pair of elements rotatably mounted on said shaft and connected with respective draft links for relative rotation in response to lateral movement of said draft links, said elements being interengageable upon a predetermined lateral movement of said draft links to prevent further relative rotation of said elements and further swinging of said draft links.

3. The invention according to claim 2, further comprising a locking means selectively interconnectable with said elements for preventing said relative rotation.

4. In an implement hitch for a tractor having a pair of draft links swingable laterally relative to the tractor, limiting means adapted to be disposed adjacent the draft links, said limiting means comprising a frame, hanger means swingably supported by said frame, a shaft supported by said hanger means, a pair of elements rotatably mounted on said shaft and connected with respective draft links for relative rotation in response to lateral swinging of said draft links, said elements being interengageable upon swinging of said draft links a predetermined distance to prevent further swinging thereof.

5. The invention according to claim 4, further comprising locking means selectively interconnectable with said elements for preventing said relative rotation.

6. In a hitch mechanism for supportably and detachably fastening an implement to a tractor, the combination comprising: a pair of generally fore-and-aft extending laterally spaced apart draft links connected with the tractor for lateral movement relative thereto, a structure mounted on the tractor intermediate said draft links and including a pair of spaced elements respectively connected with said draft links for relative rotation in response to lateral movement of said draft links, said elements being interengageable upon a predetermined amount of lateral movement of said draft links to prevent further lateral movement thereof.

7. In a hitch mechanism for supportably and detachably fastening an implement to a tractor, the combination comprising: a pair of generally fore-and-aft extending laterally spaced apart draft links, means connecting said draft links with the tractor for free lateral movement relative thereto, a structure mounted on the tractor intermediate the draft links and including a pair of spaced elements respectively connected with the draft links for relative rotation in response to lateral movement of the draft links, said elements being interengageable upon a predetermined amount of lateral movement of the draft links to prevent further lateral movement thereof.

8. In a hitch mechanism for supportably and detachably fastening an implement to a tractor, the combination comprising: a pair of generally fore-and-aft extending laterally spaced apart draft links, means connecting said draft links with the tractor for lateral swinging movement relative thereto, a structure including a pair of spaced elements connected with said draft links and rotatable relatively in response to lateral swinging of said draft links, said elements being rotatable relatively in one direction in response to lateral swinging of said draft links in one direction to a point at which said elements interengage to prevent further lateral swinging of said draft links in said one direction, said elements being rotatable relatively in another direction upon lateral swinging of said draft links in another direction to a point at which said elements interengage to prevent further lateral swinging of said draft links in said other direction.

9. In a hitch mechanism for supportably and detachably fastening an implement to a tractor, the combination comprising: a pair of generally fore-and-aft extending laterally spaced apart draft links, means connecting said draft links with the tractor for lateral and vertical movement relative thereto, lateral movement limiting mechanism mounted on said tractor intermediate said draft links, said limiting mechanism including a frame, a shaft mounted in said frame, a pair of axially aligned cylinders each including an axially extending abutment element mounted for free rotational movement about said shaft, said cylinders being connected with respective draft links for relative rotation in response to lateral movement of said draft links, said elements being abuttable with each other in response to a predetermined amount of lateral movement of said draft links to prevent further lateral movement thereof.

10. The invention according to claim 9, further comprising means operatively connected with said cylinders and abuttable with said frame for restricting vertical movement of said draft links beyond a predetermined position.

11. In a hitch mechanism for supportably and detachably fastening an implement to a tractor, the combination comprising: a pair of generally fore-and-aft extending laterally spaced apart draft links, means connecting said draft links with the tractor for lateral, vertical and longitudinal movement relative thereto, lateral movement limiting mechanism mounted on said tractor intermediate said draft links, said limiting mechanism including a frame, hanger means swingably supported by said frame, a shaft supported by said hanger means, a pair of axially aligned cylinders each including an axially extending abutment element mounted for free rotational movement about said shaft, said cylinders being connected with respective draft links for relative rotation in response to lateral movement of said draft links, said elements being abuttable with each other in response to a predetermined amount of lateral movement of said draft links to prevent further lateral movement thereof.

References Cited by the Examiner

UNITED STATES PATENTS

| | | | |
|---|---|---|---|
| 2,217,887 | 10/40 | Benjamin | 280—474 X |
| 2,653,531 | 9/53 | Collins | 280—460 X |
| 2,698,564 | 1/55 | Sawyer | 280—461 |
| 2,731,898 | 1/56 | Frevik et al. | 280—461 |
| 2,775,180 | 12/56 | Du Shane | 172—450 X |
| 2,952,323 | 9/60 | Orelind et al. | 280—461 X |
| 3,065,977 | 11/62 | Virtue et al. | 280—474 X |

PHILIP ARNOLD, *Primary Examiner.*

LEO FRIAGLIA, A. HARRY LEVY, *Examiners.*